May 20, 1969 W. G. WING 3,444,745
GYROSCOPIC APPARATUS UTILIZING INTEGRAL MODULATOR DEVICE
Filed March 28, 1966 Sheet 1 of 2

INVENTOR.
WILLIS G. WING
BY
H. P. Ferry
ATTORNEY

United States Patent Office 3,444,745
Patented May 20, 1969

3,444,745
GYROSCOPIC APPARATUS UTILIZING
INTEGRAL MODULATOR DEVICE
Willis G. Wing, Glen Head, N.Y., assignor to Sperry Rand
Corporation, a corporation of Delaware
Filed Mar. 28, 1966, Ser. No. 538,039
Int. Cl. G01c *19/28*
U.S. Cl. 74—5.6                                                10 Claims

ABSTRACT OF THE DISCLOSURE

In inertial apparatus, pickoff means having a plurality of portions rotating with the rotor portion of the inertial apparatus, each portion being energized by carrier signals having a phase associated with the position of the respective portion for providing a modulated single-sideband pickoff signal. Single-sideband reference signal generating means having a like plurality of capacitive rotor portions rotating with the rotor portion of the inertial apparatus and energized by like phases of the carrier signals cooperative with a capacitive stator portion for providing a single-sideband reference signal compatible with the pickoff signal for simplified demodulation.

---

The present invention relates to improved gyroscopic apparatus and particularly to simplified signal processing of gyroscopic signals.

A gyroscope having a rotating sensitive element in the form of a fluid rotor is disclosed in my U.S. Patent No. 3,058,359, entitled "Fluid Rotor Gyroscopic Apparatus," issued Oct. 16, 1962, and assigned to the same assignee as the present invention. In said U.S. Patent 3,058,359, the fluid rotor gyroscope is discussed in terms of the differential pressure created between points at the surface of a body of liquid contained in a substantially spherical cavity when this fluid body is spun by means of spinning its containing cavity and under the conditions where the spin axis of the cavity is not parallel to the spin axis of the fluid body. As explained in that patent, the resultant pressure is due to centrifugal effects within the fluid body and the differential pressure is sensed by pressure transducers placed in passages which communicate with the cavity at the points where it is desired to sense the pressure.

My improvement patent application Ser. No. 473,771, entitled "Compensation Apparatus for Inertial Devices," filed July 21, 1965, discloses the pressure transducers excited by a carrier signal with four pressure transducers arranged symmetrically around the waist of the spherical cavity and each of the transducers being excited by one of the four quadrants of the carrier phase. Each transducer is responsive to a pressure signal from the fluid rotating within the spherical cavity. These signals are displaced 90° in spin frequency phase from that received by the next transducer and the output of all four transducers is added. The resultant is a single-sideband signal. The amplitude and phase of this sideband signal are measures of the pressure detected by the transducers and therefore the gyro input angular rate. As disclosed in said patent application Ser. No. 473,771, the processing of the single-sideband signal external of the gyroscope consists of two demodulation steps, the first demodulation is at the carrier frequency and it is followed by a second demodulation at the spin frequency of the spherical cavity. The demodulation at spin frequency is accomplished by utilizing a spin frequency reference alternator.

In the present invention, the gyroscope utilizes a single-sideband reference generator within the gyroscope having one portion rotating with the spherical cavity. The single-sideband reference generator is a fixed air gap, variable area capacitor in which the area is modulated at the spin frequency of the spherical cavity. By exciting the rotor element of this capacitor by the same quadrants of carrier phase which excite the transducers, a fixed amplitude single-sideband reference signal is generated. Then, a single demodulation of the single-sideband transducer signal with respect to the single-sideband reference signal is all that is necessary to produce discrete output signals with respect to each of the two input axes.

It therefore is a primary object of the present invention to provide gyroscopic apparatus having improved means for obtaining and processing the output signals therefrom.

It is an additional object of the present invention to provide gyroscopic apparatus having a capacitive modulator device which simplifies output signal processing.

It is a further object of the present invention to provide an improved capacitive modulator device having a simplified design configuration which lends itself to providing accurate modulation of a desired type.

These and other objects of the present invention will become apparent by referring to the drawings wherein like reference numerals indicate like elements:

Figure 1:
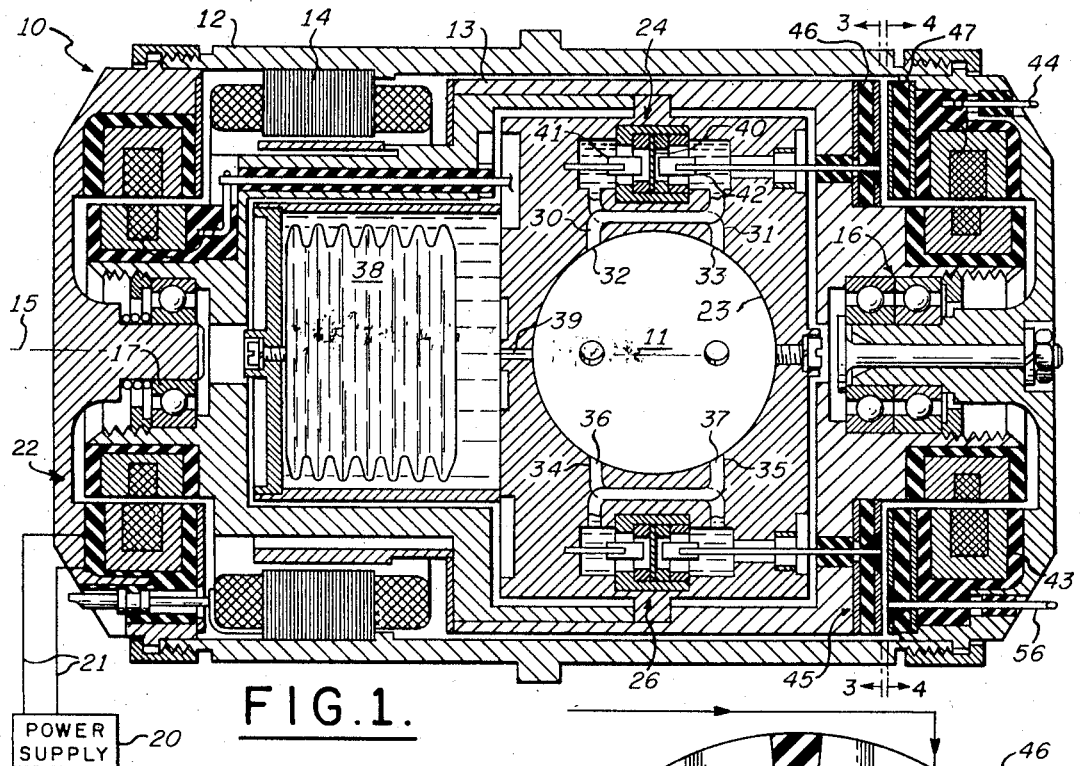
FIG. 1 is a cross-sectional view of a fluid rotor gyroscope incorporating the present invention.
Figure 4:
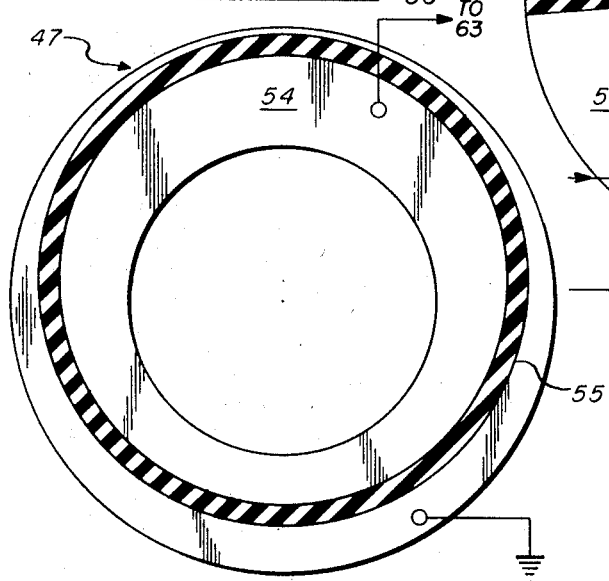
FIG. 4 is an end view taken along lines 4—4 of FIG. 1 showing the stator of the capacitive modulator device.

Referring now to FIG. 1, the present invention will be described with respect to a gyroscopic apparatus 10 having a fluid rotor 11. The gyroscopic apparatus 10 may be generally of the type disclosed in said U.S. Patent No. 3,058,359, preferably, as modified by the teaching of said U.S. patent application Ser. No. 473,771. The gyroscope 10 has a stationary housing or stator 12 within which a rotatable assembly or rotor 13 is driven by means of a motor 14 about a spin axis 15 defined by spaced bearings 16 and 17. A power source 20 for providing a carrier signal, for example, having a frequency of 10 kc., is connected through input lead 21 and across an input rotary transformer 22 to provide power from the housing 12 to the components mounted on the rotatable assembly 13. The rotary transformer 22 may be generally of the type disclosed in U.S. Patent No. 2,432,982, issued Dec. 23, 1947, to F. D. Braddon et al., entitled "Inductive Coupling."

Within the rotatable assembly 13 is an essentially spherical cavity 23 which contains and defines the fluid rotor 11. In order to sense the deviation of the spin axis of the fluid defining the rotor 11 from the spin axis 15 of the cavity 23 to provide a measure of the input angular rotation about an input axis of the gyroscope 10, as more fully explained in said Patent 3,058,359 and said patent application Ser. No. 473,771, the cavity 23 also communicates with opposite sides of a plurality of pressure transducers 24 orthogonally disposed around the equatorial circumference of the spherical cavity 23 in a plane perpendicular to the spin axis 15. In the embodiment disclosed, the pressure transducers 24, 25, 26 and 27 are disposed at the 0°, 90°, 180° and 270° positions with only the pressure transducers 24 and 26 disposed at the 0° and 180° positions being shown in FIG. 1, it being understood that the pressure transducers 25 and 27 disposed at the 90° and 270° positions are utilized but are not shown in FIG. 1. The cavity 23 communicates with opposite sides of the pressure transducer 24 through tubes or passages 30 and 31 via ports 32 and 33, respectively. The cavity 23 also communicates with opposite sides of the pressure transducer 26 through passages 34 and 35 via ports 36 and 37, respectively. A fluid expansion bellows 38 is also mounted on the rotatable assembly 13 such that the fluid surrounding the bellows 38 communicates with the cavity 23 through a passage 39.

Each of the pressure transducers, such as 24, consists of a thin displaceable metallic diaphragm 40 disposed between metallic rods 41 and 42. Each transducer is essentially a capacitive microphone which operates on variations in the capacitance between the diaphragm 40 and the rods 41 and 42 as a result of the motion of the diaphragm 40 due to differential pressures in the fluid defining the rotor 11, as more fully explained in said U.S. patent application Ser. No. 473,771.

Figure 2:
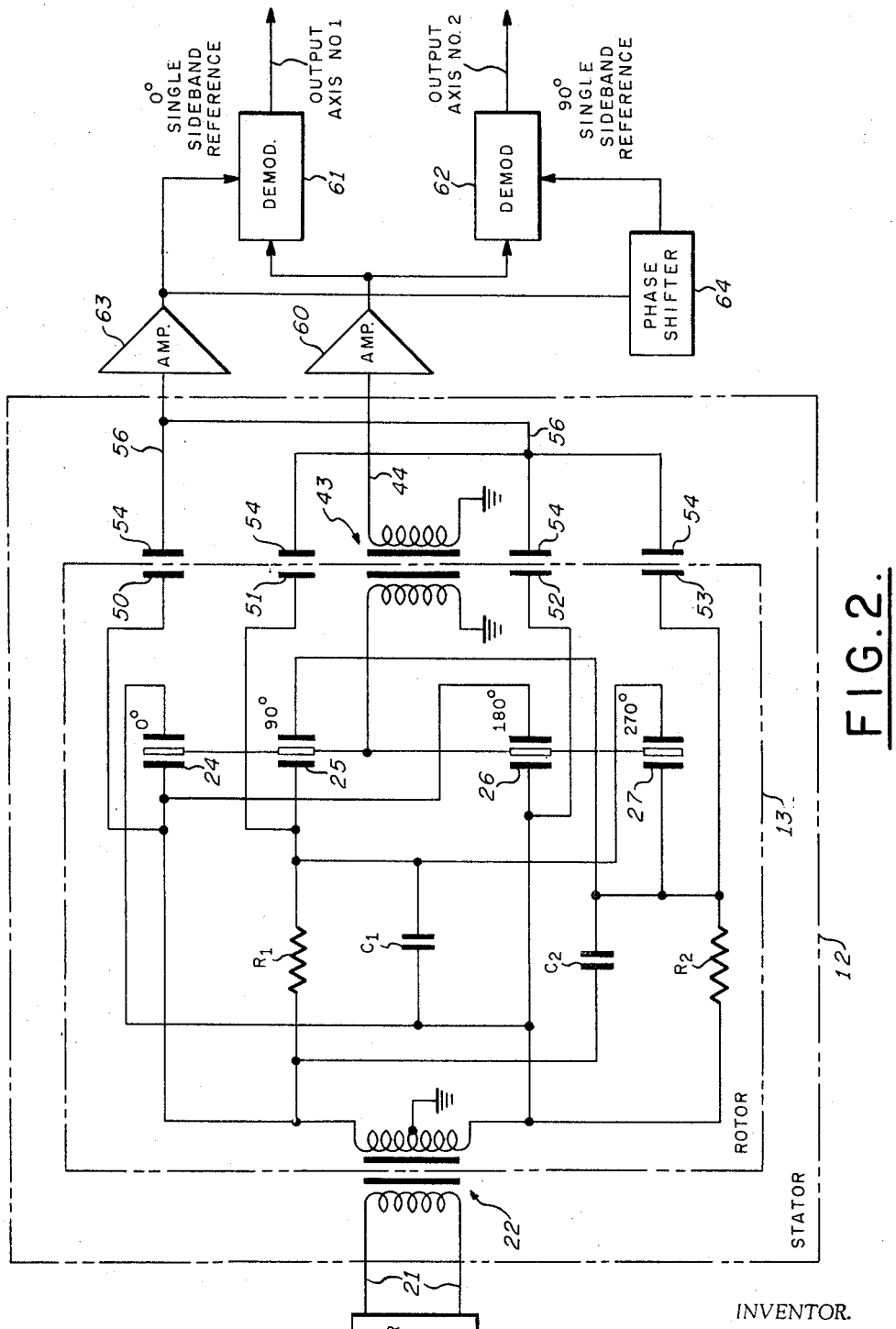
FIG. 2 is an electrical schematic wiring diagram of the fluid rotor gyroscope and external signal processing circuits utilizing the present invention.

The carrier signal from the source 20 is applied through the input rotary transformer 22 to the respective rods of each of the pressure transducers 24, 25, 26 and 27 as shown in FIG. 2. The alternating voltage from the input rotary transformer 22 is applied directly to the respective rods of the transducers 24 and 26 and to the transducers 25 and 27 through lattice networks comprised of resistor $R_1$, resistor $R_2$, capacitor $C_1$ and capacitor $C_2$ which provide an electrical phase shift of 90°. The outputs of the four transducers 24, 25, 26 and 27 are summed and applied through an output rotary transformer 43 to output leads 44.

With respect to the teaching of the electrical processing of the summed output signal from the four transducers as disclosed in said U.S. patent application Ser. No. 473,771, it has been determined that the summed transducer output is a single-sideband output derived by modulation of the four carrier voltage phases 0°, 90°, 180° and 270° by the four capacitive transducers 24, 25, 26 and 27. The single-sideband output signal is of the form $$e_o = kW[\sin \omega_c t \sin (\Omega t + \phi) + \cos \omega_c t \cos (\Omega t + \phi)] \quad (1)$$

where k = a constant dependent upon the specific design
W = applied rate input (total vector normal to spin axis)
$\omega_c$ = carrier frequency; i.e., 10 kc.
$\Omega$ = spin frequency; i.e., 100 c.p.s.
$\phi$ = space phase of total input vector As disclosed in said U.S. application Ser. No. 473,771, after amplification, this signal was subjected to phase sensitive demodulation followed by 100 c.p.s. demodulation with respect to two reference phases of spin frequency. Two D.C. voltage outputs, each proportional to an orthogonal component of input rate were thus produced.

The basic limitations to this processing method are related to the 100 c.p.s. demodulation, and are as follows:

(1) The transformers in the 100 c.p.s. demodulators are relatively bulky.

(2) It is very difficult to obtain wide bandwidth with demodulators operating at a low frequency such as 100 c.p.s.

(3) Good linearity over a wide range is a severe demand on the 100 c.p.s. demodulators.

(4) The 100 c.p.s. demodulators operate as squarewave switching devices. They, therefore, have a D.C. response to odd harmonics of spin-frequency which would be present in the gyro output under angular vibration at certain frequencies.

Referring again to the expression for the summed transducer output, Equation 1, it is recognized that this can be expressed as a single-sideband signal equivalent to $$e_o = kW[\cos \phi \cos (\omega_c - \Omega)t + \sin \phi \sin (\omega_c - \Omega)t] \quad (2)$$

where $\omega_c - \Omega$ = lower sideband of carrier and spin frequencies

It will be appreciated that various connections are possible to obtain either the lower sideband or the upper sideband.

In accordance with the present invention a single-sideband generator 45 is provided having a rotor portion 46 mounted on the rotatable assembly 13 and a cooperative stator portion 47 mounted on the housing 12.

Figure 3:
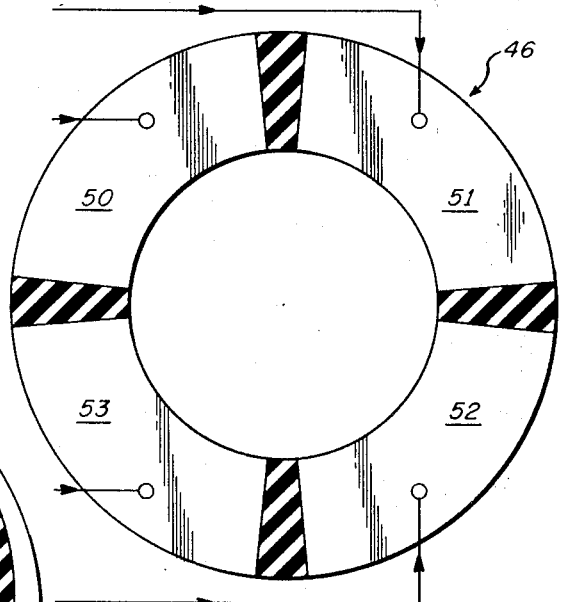
FIG. 3 is an end view taken along the lines 3—3 of FIG. 1 showing the rotor of the capacitive modulator device of the present invention.

In the embodiment shown in FIG. 3, the rotor portion 46 comprises an annular configuration divided into quadrants defined by four capacitive plates 50, 51, 52 and 53 energized by the same quadrants of the carrier phase which excite the associated pressure transducers 24, 25, 26 and 27, i.e., 0°, 90°, 180° and 270°, respectively. The quadrants 50, 51, 52 and 53 are electrically insulated from each other by suitable insulation.

The stator portion 47 comprises a matching annular configuration having an effective cooperative capacitive plate 54 defined by an insulating strip 55 which permits the effective area of the plate 54 to be of a suitable geometry for producing any desired output signal, which in this instance is arranged to produce a pure sinusoidal variation versus angle of rotation of the rotatable assembly 13. A sinusoid will be obtained if the stator curve is defined by $$dA/d\theta = \sin \theta + C$$

but $$dA = \tfrac{1}{2}\rho^2 d\theta$$

then $$\tfrac{1}{2}\rho^2 = \sin \theta + C$$

where

A = area of the stator plate
$\theta$ = angle from reference line
$\rho$ = radius of the curve
C = arbitrary constant (required to make $\rho$ always positive)

The stator capacitive plate 54 is arranged to be eccentric in order that when the rotor 46 and stator 47 are brought face-to-face as disclosed in FIG. 1 with an axial air gap therebetween, there is the equivalent of four air gap capacitors established between the rotor 46 and the stator 47. Because the stator plate 54 is eccentric, these equivalent capacitors are modulated at the spin frequency of the gyroscope 10 by the motion of the rotor 46.

By exciting the rotor quadrants 50, 51, 52 and 53 by the same quadrants of carrier phase which excite the transducers 24, 25, 26 and 27 as explained above and shown in FIG. 2, a fixed amplitude single-sideband reference signal is generated on the output leads 56 of the stator 47. Then, as shown in FIG. 2, demodulation of the summed single-sideband output signal from the pressure transducers 24, 25, 26 and 27 with respect to the single-sideband reference signal from the generator 45 is all that is necessary to provide the required two D.C. output voltages representative of the output signal with respect to the two input axes of the gyroscope 10. This is accomplished by connecting the amplified output signal from the transducers 24, 25, 26 and 27 via amplifier 60 to demodulators 61 and 62.

Referring again to Equation 2

$$e_o = kW[\cos \phi \cos (\omega_c - \Omega)t + \sin \phi \sin (\omega_c - \Omega)t]$$

In this expression the first term in the brackets (with cos $\phi$ as its coefficient) is proportional to the internal angular displacement about one axis while the second term (with sin $\phi$ as its coefficient) is proportional to the internal angular displacement about an axis at 90° to the first.

A phase sensitive demodulator having a reference of the form $e \cos (\omega_c - \Omega)t$ will yield a D.C. voltage proportional to the first term while one having a reference of the form $e \sin (\omega_c - \Omega)t$ will yield a D.C. voltage proportional to the second term.

The 0° phase of the single-sideband reference signal from the stator 47 is connected via amplifier 63 to the demodulator 61 while the 90° phase of the reference signal is connected via amplifier 63 and a 90° phase shifter 64 to the demodulator 62. The demodulator 61 demodulates the output signal from the amplifier 60 with respect to the 0° phase of the reference signal to provide a D.C. output signal with respect to a first axis. Similarly, the demodulator 62 demodulates the output signal from the amplifier 60 with respect to the 90° phase of the reference signal to provide a D.C. output signal with respect to a second axis. The D.C. output signals have a magnitude and polarity representative of the rate and direction of the applied angular input.

It will be realized that an important element of the subject invention is the single-sideband generator 45 which may also be described as a capacitive modulator device or an electromechanical unit which is the equivalent of a shaft-angle resolver. This device provides the same electromechanical trigonometric relationships conventionally provided by a winding type resolver control transformer. It can therefore be used, (a) to provide trigonometric components of a rotating vector represented by shaft angle, (b) as a frequency differential, and (c) as a combination of the foregoing to provide a single-sideband phase reference in processing data derived from a synchronized rotating source as described above with respect to the gyroscope 10. As opposed to a conventional winding-type resolver, these functions are provided free of slot ripple.

There are other capacitive modulators which provide the equivalent basic function. However, all known devices of this type have the disadvantage of distortion, i.e., the modulating function is only an approximation to a true sinusoid, containing undesirable harmonic content. The device of the present invention has a theoretical capability of producing absolutely pure sinusoidal modulation; this capability derives from the fact that the change in capacitance results from change in viewed area as a function of shaft angle. Because the configuration lends itself to photographic reproduction by electroetching processes, the contour which leads to the area change can be made to represent whatever geometry is necessary to produce a pure sinusoidal variation vs. shaft angle.

Another advantage of the device is its design capability to provide theoretically constant, balanced source impedance which results in theoretically zero transmission of the nonmodulated residual carrier.

Further advantages of this arrangement are:

(1) Signal processing is simplified because the spin frequency demodulation is no longer necessary.

(2) Significant size and weight reduction is achieved because the spin frequency circuits which are eliminated involve the largest size components; i.e., 100 c.p.s. transformers.

(3) The spin frequency demodulators operate as square wave switching devices. They therefore have a respect to odd harmonics of spring frequency which may be present in the gyro output; for example, vibration induced signal components. When demodulation is done at spin frequency, false D.C. outputs are produced at any input vibration frequency which produces an odd harmonic at spin frequency in the output (these are, in general, the even harmonics of spin frequency). With the single sideband processing, on the other hand, such angular vibrations result in frequencies which are not harmonically related to the reference frequency and hence result in no such false D.C. outputs.

It is, of course, possible to determine vibration frequencies which produce outputs which are harmonically related to the sideband reference frequency but the first such case possible (for an original excitation frequency of 10 kc., a spin speed of 100 c.p.s. and a connection which yields the lower sideband of spin and excitation frequencies) would be a vibration frequency of 19,800 c.p.s. Such a frequency as this is not a source of concern in the great majority of applications.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. In an inertial apparatus energized by a carrier signal and having rotor and stator portions,
    (a) pickoff means rotating with said rotor portion and energized by said carrier signal and responsive to movement of said inertial apparatus for providing a modulated single-sideband pickoff signal representative of said movement,
    (b) single-sideband reference signal generating means energized by said carrier signal and having one portion mounted on said rotor portion and another portion mounted on said stator portion for providing a single-sideband reference signal, and
    (c) demodulating means responsive to said pickoff signal and said reference signal for providing an output signal representative of the movement of said inertial apparatus.

2. In apparatus of the character recited in claim 1 in which said pickoff means includes a plurality of pickoffs equally spaced with respect to each other for providing a summed output that is modulated single-sideband pickoff signal and in which said reference signal generating means includes a capacitive modulator device having a capacitive rotor plate comprised of a like plurality of sections with respect to said pickoffs and mounted on said rotor portion and a capacitive stator plate mounted on said stator portion, each of said pickoffs and associated rotor sections being energized by like phases of said carrier signal whereby a single-sideband reference signal is provided compatible with said pickoff signal.

3. In an inertial apparatus of the character recited in claim 2 in which said plurality of pickoffs comprise four pickoffs orthogonally disposed at 0°, 90°, 180° and 270° energized by said carrier signals having a like phase 0°, 90°, 180° and 270°, respectively, and said plurality of rotor sections of said capacitive rotor plate comprises four rotor quadrants energized by the same quadrants of carrier phase which excite said four pickoffs, respectively, whereby a fixed amplitude single-sideband reference signal is generated compatible with said pickoff signal.

4. In an inertial apparatus of the character described in claim 3 in which said demodulating means comprises first and second demodulators each responsive to said summed pickoff signal with said first demodulator being responsive to a first phase of said single-sideband reference signal for demodulating said summed pickoff signal with respect to said first phase reference signal and said second demodulator being responsive to a second phase of said single-sideband reference signal 90° out of phase with respect to said first phase for demodulating said summed pickoff signal with respect to said second phase for providing D.C. outputs representative of movement with respect to first and second input axes, respectively.

5. In an inertial apparatus energized by a carrier signal,
    (a) a fluid,
    (b) means for containing said fluid within a cavity,
    (c) means for spinning said containing means about an axis thereof thereby also spinning said fluid,
    (d) pickoff means energized by said carrier signal and communicating with said fluid within said cavity for providing a pickoff signal representative of the movement of said apparatus, said pickoff signal being modulated as a function of the spin frequency and the input movement,
    (e) reference signal generating means energized by said carrier signal and having one portion mounted on said spinning containing means for providing a reference signal modulated as a function of said spin frequency and compatible with said pickoff signal, and (f) demodulating means responsive to said pickoff signal and said reference signal for demodulating said pickoff signal with respect to said reference signal for providing an output signal representative of the movement of said inertial apparatus.

6. In apparatus of the character recited in claim 5 in which said pickoff means includes a plurality of pickoffs equally spaced with respect to each other for providing a summed output that is modulated single-sideband pickoff signal and in which said reference signal generating means includes a capacitive modulator device having a capacitive rotor plate comprised of a like plurality of sections with respect to said pickoffs and a capacitive stator plate each of said pickoffs and associated rotor sections being energized by like phases of said carrier signal for providing a single-sideband reference signal.

7. In an inertial apparatus of the character recited in claim 6 in which said plurality of pickoffs comprise four pickoffs orthogonally disposed at 0°, 90°, 180° and 270° and are energized by carrier signals having a like phase 0°, 90°, 180° and 270° and said plurality of rotor sections of said capacitive rotor plate comprise four rotor quadrants energized by the same quadrants of carrier phase which excite said four pickoffs, respectively, whereby a fixed amplitude single-sideband reference signal is generated.

8. In an inertial apparatus of the character described in claim in which said demodulating means is responsive to said summed single-sidebank signal and comprises first and second demodulators each responsive to said summed signal and said first demodulator is responsive to a first phase of said single-sidebank reference signal for demodulating said summed signal with respect to said first phase reference signal and said second demodulator is responsive to a second phase of said single-sideband reference signal 90° out of phase with respect to said first phase for demodulating said summed signal with respect to said second phase reference signal for providing D.C. outputs representative of movement with respect to first and second input axes, respectively.

9. In an inertial apparatus energized by a carrier signal,
(a) a fluid,
(b) means of containing said fluid within a cavity,
(c) means for spinning said containing means about an axis thereof thereby also spinning said fluid,
(d) pickoff means energized by said carrier signal and communicating with said fluid within said cavity for providing a pickoff signal representative of the movement of said apparatus, said pickoff signal being modulated as a function of the spin frequency and the input movement,
(e) reference signal generating means energized by said carrier signal and having one portion mounted on said spinning containing means for providing a reference signal modulated as a function of said spin frequency and compatible with said pickoff signal, and
(f) demodulating means responsive to said pickoff signal and said reference signal for demodulating said pickoff signal with respect to said reference signal for providing an output signal representative of the movement of said inertial apparatus,
(g) in which said pickoff means includes a plurality of pickoffs equally spaced with respect to each other for providing a summed output that is a modulated single-sideband pickoff signal and in which said reference signal generating means includes a capacitive modulator device having a capacitive rotor plate comprised of a like plurality of sections with respect to said pickoffs and a capacitive stator plate each of said pickoffs and associated rotor sections being energized by like phases of said carrier signal for providing a single-sideband reference signal,
(h) in which said capacitive stator plate has an effective portion eccentric with respect to said rotor plate, said effective portion being so constructed and arranged to provide a desired variation in reference signal with respect to the rotation angle of said rotor plate.

10. In an inertial apparatus energized by a carrier signal,
(a) a fluid,
(b) means for containing said fluid within a cavity,
(c) means for spinning said containing means about an axis thereof thereby also spinning said fluid,
(d) pickoff means energized by said carrier signal and communicating with said fluid within said cavity for providing a pickoff signal representative of the movement of said apparatus, said pickoff signal being modulated as a function of the spin frequency and the input movement,
(e) reference signal generating means energized by said carrier signal and having one portion mounted on said spinning containing means for providing a a reference signal modulated as a function of said spin frequency and compatible with said pickoff signal, and
(f) demodulating means responsive to said pickoff signal and said reference signal for demodulating said pickoff signal with respect to said reference signal for providing an output signal representative of the movement of said inertial apparatus,
(g) in which said pickoff means includes a plurality of pickoffs equally spaced with respect to each other for providing a summed output that is a modulated single-sideband pickoff signal and in which said reference signal generating means includes a capacitive modulator device having a capacitive rotor plate comprised of a like plurality of sections with respect to said pickoffs and a capacitive stator plate each of said pickoffs and associated rotor sections being energized by like phases of said carrier signal for providing a single-sideband reference signal,
(h) in which said capacitive stator plate has an effective portion eccentric with respect to said rotor plate, said effective portion being so constructed and arranged to provide a pure sinusoidal variation in reference signal with respect to the rotation angle of said rotor plate.

References Cited

UNITED STATES PATENTS

| | | | |
|---|---|---|---|
| 2,633,028 | 3/1953 | Fillebrown | 74—5.6 |
| 2,925,590 | 2/1960 | Boltinghouse et al. | 74—5.6 X |
| 3,224,281 | 12/1965 | Blazek | 74—5.6 |
| 3,260,122 | 7/1966 | Rocks | 74—5.6 X |
| 3,313,162 | 4/1967 | Bundschuh | 74—5.6 |
| 3,323,377 | 6/1967 | Fraiser | 74—5.6 |

FRED C. MATTERN, JR., *Primary Examiner.*

F. D. SHOEMAKER, *Assistant Examiner.*

U.S. Cl. X.R.

317—253